Sept. 21, 1954
B. NAGLER
2,689,616
HELICOPTER ROTOR CONTROL MECHANISM
Filed Feb. 18, 1952
2 Sheets-Sheet 2
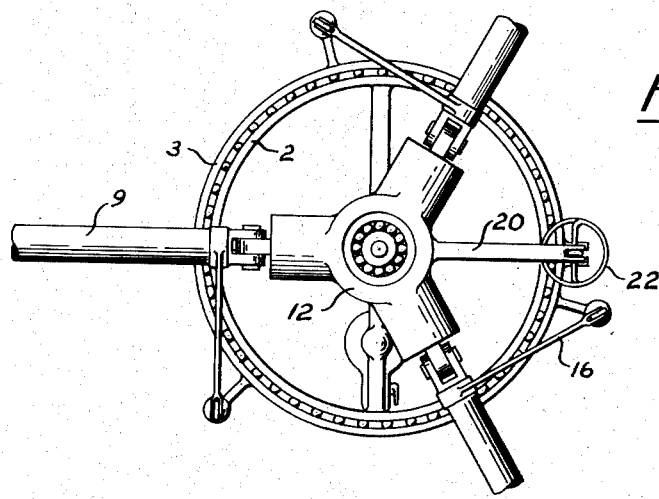
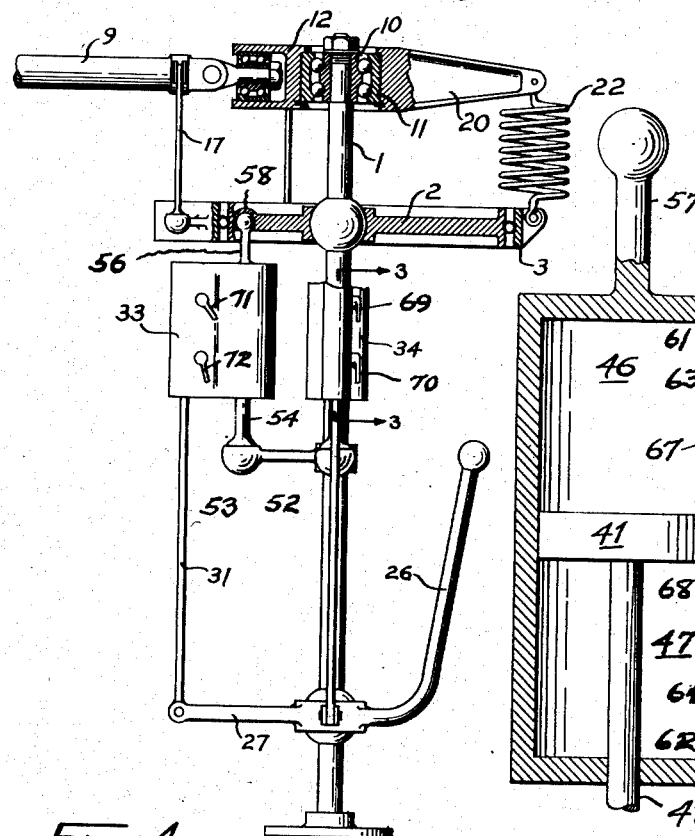
INVENTOR.
BRUNO NAGLER
BY Martin J. Finnegan
ATTORNEY Patented Sept. 21, 1954

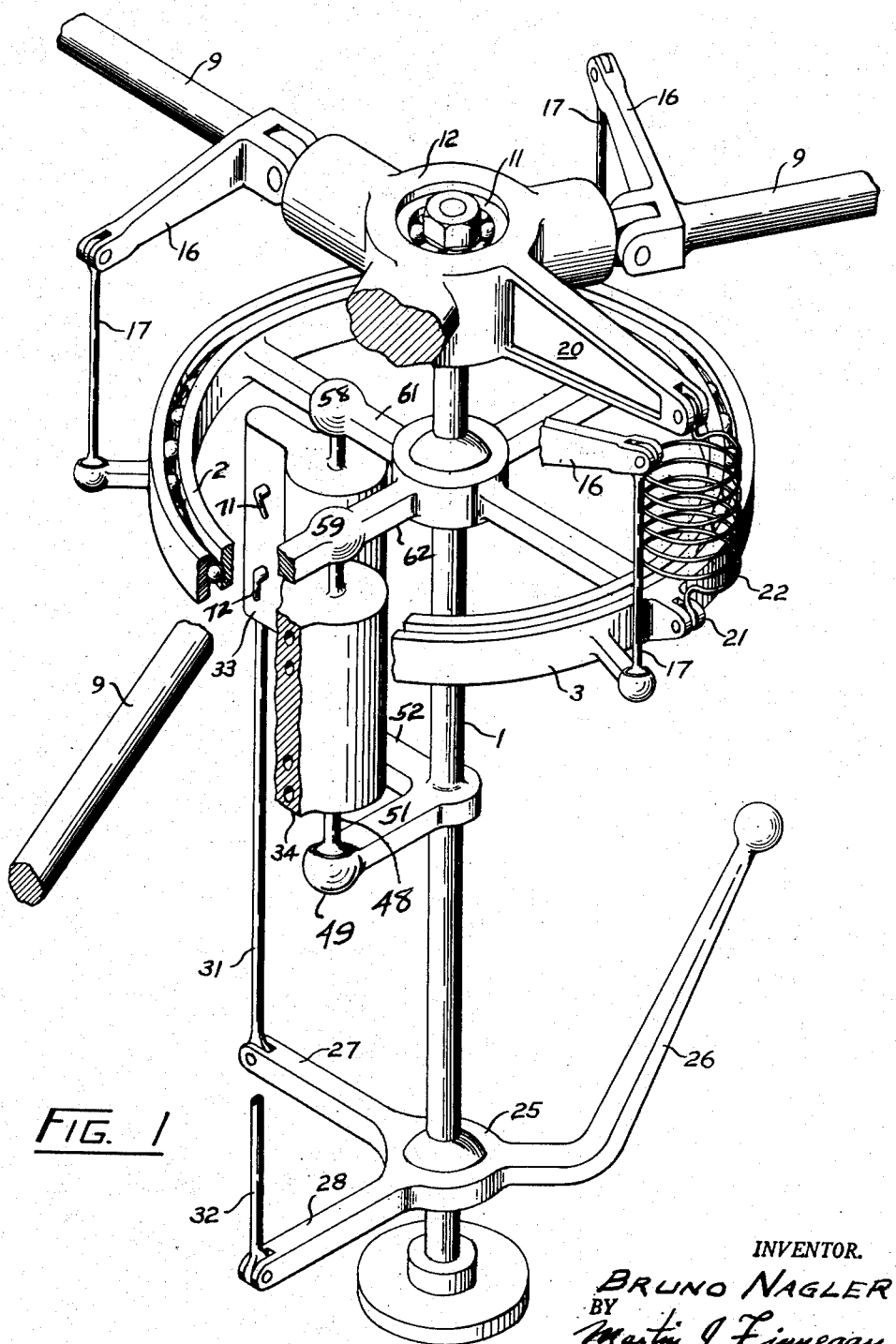

2,689,616

UNITED STATES PATENT OFFICE 2,689,616

HELICOPTER ROTOR CONTROL MECHANISM

Bruno Nagler, Boston, Mass., assignor to Nagler Helicopter Company, Inc., a corporation of Delaware Application February 18, 1952, Serial No. 272,108

4 Claims. (Cl. 170—160.25)

This invention relates to a helicopter aircraft in which the individual blades of the "rotary wing" assembly are rotatable about their individual axes, and can be given varying angles of incidence so that the lifting action can be varied, as a whole, or made selectively different at different points of the circle of revolution, the points in the said circle of greatest or smallest angle of incidence being variable at will.

Such an assembly is disclosed in my Patent No. 1,909,845 and the object of the present invention is to improve the mechanical and structural features of such an assembly especially in the mechanism for making the respective angles of incidence of the several blades selectively different at different points of the circle of revolution, that is to say, for controlling cyclic pitch.

With a rotary wing assembly constructed as in my former patent, there are provided two ball-bearing units of a large diameter. The larger of these units may be termed a "support unit," the outer of the ball race rings of which is rigidly secured to the aircraft frame while the other ball race, driven from the engine, is used as the base for bracing the rotary wing hub, and for bracing the blade arms.

Within the support unit is located the second ball-bearing unit, of smaller, but still large diameter which may be termed a "control unit." The inner ball race ring of the control unit is mounted on the aircraft frame secured against rotation about its own axis, but capable of being moved to displace its center along the axis of the support unit and gimbaled in a universal joint to permit adjustment of the angular position of that axis relative to the aircraft frame. This inner control ball race ring is actuated directly by manual control members, and the other control ball race ring actuates the members which effect the angular adjustment of the blades. Relative movement between the manual control members and the blade adjusting members takes place through the relative turning of the two ball bearing rings.

For modifying the inclination of the plane of rotation of the said control ball bearing relatively to the aircraft frame and hence the rotary wing axis, there is provided a control lever for controlling the orientation of said inner control race in its gimbals. Means are provided for causing the outer control ball race to rotate with the inner support ball race while remaining free to assume any plane of orientation relative thereto permitted by said gimbals.

While such an arrangement is workable, it has the disadvantage of being sensitive to the external forces acting directly upon the rotating blades, which forces are transmitted back to the control lever, thereby requiring constant maneuvering by the operator, to keep the blade angles correctly disposed.

The present invention eliminates this difficulty by interposing irreversible control elements, utilizing internally supplied power amplification, to transmit the control impulses.

The invention is illustrated in the accompanying drawings, wherein:

Figure 1 is a perspective view of a scheme of construction of a mechanism for making the respective angles of incidence of the several blades of the rotary wing assembly of a helicopter aircraft selectively different at different points of the circle of revolution according to the invention, with certain portions broken away to reduce the size of the drawings.

Figure 2 is a plan on a further reduced scale of a portion of a mechanism according to Figure 1.

Figure 3 shows a sectional view on an enlarged scale, of one of the two hydraulic units of the mechanism shown, as illustrated in Figure 1; and Figure 4 is an elevation on the same scale as Figure 2, of the mechanism according to Figure 1, with certain parts in section.

In the aircraft body there is provided a mounting post 1 carrying an inner control ball-bearing race or ring 2. The outer control ball race 3 is rotatable around the race 2, being a part of the rotary wing assembly.

The blade arms 9 carry cranks 16 which are linked by means of rods 17 to the outer ball race ring 3 which is concentric with the support ball bearing assembly 10, 11 whose inner ball race ring 10 is carried on the upper end of the supporting post 1 vertically adjustable thereon by means, not shown, to alter its spacing from control bearing 2, 3, and whose outer race 11 rotates with the hub 12 of the rotary assembly. The rods 17 ensure that the outer control ball race ring 3 shall participate in the rotation of the hub 12. The latter is provided with an arm 20 linked to the peripheral yoke 21 of the ball race 3 by the interposed coiled tension spring 22 which urges the race 3 toward the arm 20. The ring 2, and therefore the whole ball bearing assembly, 2—3, may be tilted out of its normal attitude perpendicular to post 1 by the novel control means now to be described.

On the supporting post 1 is articulated the Cardan or universal joint frame 25 having integrated therewith a control lever 26, and two arms 27, 28, ninety degrees apart, and having rods 31, 32, pivoted thereto. These rods extend upward to enter the cylinder blocks 33, 34 respectively, one of which cylinder blocks is shown in vertical section, and on a larger scale, in Fig. 3. Referring to Fig. 3, the block 34 is there shown as housing a piston 41 and a compound valve 42, 43 controlling flow of oil, or other incompressible liquid, between the upper and lower chambers 46, 47 into which the cylinder proper of block 34 is divided by the piston 41. The valve operating rod 32 extends through valve parts 42 and 43, to move both in unison. Piston rod 48 holds piston 41 against longitudinal motion, by reason of its having a spherical end which is retained in stationary socket 49 at the outer end of arm 51; the arms 51 and 52 being integral with post 1, and with each other. Arm 52 has a similar socket 53 at its outer end, to receive the spherical end of piston rod 54, whose action is similar to that of rod 48; it being understood that cylinder block 33 is the same as cylinder block 34 in construction and operation. From the cylinders 33 and 34 rods 56, 57 extend upwardly to terminate in spherical ends retained in sockets 58, 59, respectively, formed on spokes 61, 62 of the wheel assembly of which inner control ball race 2 is an integral part. The interior spaces of cylinder blocks 33, 34 are filled with oil and all piston rods and valve stems entering those blocks are suitably sealed against leakage under pressure. Because of this arrangement, the occurrence of a force tending to cause relative movement between block 34 and piston 41 will create a fluid pressure differential in cylinder chambers 46, 47. Such force is imposed when rods 56 and 57 are urged up and down by the action of spring 22 on the outer rotating race 3. The force will be acting down on each rod when the spring 21 is on the opposite side of post 1 from each rod and the force will be acting upwards on each rod when the spring 22 is rotated to the same side of the post 1 as each rod. However, because the cylinder blocks contain an incompressible liquid, there will be no actual movement of the rods 56, 57 unless valve rods 31, 32 are moved to open either valve passages 63 or 64. Movement of the rods 56, 57 will then change the tilt of the inner ball race 2 and therefore the outer ball race 3 which in turn will change, by means of rods 16 and 17, the pitch of blades 9. It is to be noted that the two rods 31, 32 may be shifted equally, or unequally, and in the same or opposite directions, depending upon the angle assumed by lever 26 as it is manually rocked by the operator. In any case, as the valve rods shift, the associated valve parts (42, 43 as viewed in Fig. 3) permit fluid flow to occur from one of the chambers 46, 47 to the other; the flow being brought about through the passages 61 to 66, in block 34, and similar passages in block 33. Passages 61 and 62 contain ball valves that are spring-biased to the left, to close off flow, and passages 63 and 64 contain ball valves that are spring-biased to the right, to close off flow. Passages 63 and 64 also contain rotary valves 67, 68 that are adapted for manual setting by manipulation of handles 69, 70, respectively; there being similar handles 71, 72 for the corresponding valves of block 33. Passages 65, 66 extend through valve parts 42, 43 respectively, to permit flow through these valve parts as they move up or down.

In operation, when the operator wishes to make a particular change in the respective angles of incidence of the blades of the rotary wing (not shown) at the extremities of blade arms 9, he rocks lever 26 through an appropriate angle, thereby shifting the valve parts in blocks 33, 34 correspondingly. Let it be assumed that control rod 32 is pushed up. This will in turn raise valve parts 43 and 42 to open passage 63, but will leave passage 64 still closed. The valve parts will be easy to move because passages 66 and 65 will prevent any entrapment of liquid in the areas above part 43 and below part 42. Now during the time spring 22 is on the same side of the post 1 as rod 57, it will tend to pull rod 57 and thus cylinder casing 34 in an upward direction in relation to piston 41 since piston 41 is fixed to bracket 51 which in turn is integral with the support post. This will cause a pressure differential between the area above the piston and the area below, with the area below having the higher pressure. Fluid will then pass through check valve 62, passage 65 and passage 63 (since it was opened when rod 32 was pushed up) into the area above the piston. This will then allow the cylinder block to move up in relation to piston 41 and valve parts 43 and 42 until part 43 again closes passage 63 at which time the system is again in equilibrium. During the time of rotation that spring 22 is on the opposite side of post 1, it will create a pressure differential where the area above the piston has the higher pressure. However, there will be no fluid flow from above to below the piston because passage 64 is closed by valve part 42 and fluid can not flow against the check valve in passage 62. The cylinder block therefore remains fixed during the time the spring 22 is on the opposite side of the post from rod 57 and only moves when the spring is on the same side, thus, the cylinder block travels in a series of short stop and go motions until it reaches the equilibrium point where 63 and 64 are both closed. Since, the blades 9 are rotating at a relatively high r. p. m., the movement of the cylinder block and change of tilt of ring 3 will appear smooth and constant.

When the lever 32 is moved in a downward direction, the movement of the cylinder block with respect to the position of spring 22 to the rod 57 is opposite to that when lever 32 is moved up. That is, the cylinder block moves down only when the spring is on the opposite side of the post 1 from rod 57. In this position, rod 57 and cylinder block 34 are urged downward thus creating a higher pressure above the piston than below. Fluid will then flow through 61, 66 and 64 since 64 is opened when rod 32 is moved downward. This allows the cylinder block 34 to move downward until passage 64 is closed by valve part 42 at which time the system is again in equilibrium. When the spring is on the same side of the post 1 as rod 57, then the higher pressure area will be below the piston, however, there will be no relative movement between the piston and the cylinder block because passage 63 will be closed by part 43 and passage 61 will be closed by the check valve.

It will be observed that the cylinder blocks 33, 34 and their associated pistons and valves function as hydraulically controllable extensible and retractable pitmans permitting elongation or contraction of the link (or pitman) connecting points 58, 59 with points 53, 49, respectively at will under the control of stick 26. The pumping force, or energy input, is derived from rotation of the main rotor hub 12 and imparted through spring 22 as an alternate up-and-down force applied on a sine curve of sign and magnitude during one rotor revolution. If all fluid were withdrawn from blocks 33, 34, the tension of spring 22 would produce the maximum misalignment between hub 12 and race 2 and each revolution of the rotor would produce one maximum up-and-down stroke cycle of the piston in each block. The introduction of oil and valving permitting controlled one-way flow thereof utilizes this motion to activate the two-way pitman control system which is not dependent upon an outside source of energy.

It will be observed that control ball-bearing assembly 2, 3 in the present specification corresponds in function to control ball-bearing assembly 18, 19 in my said earlier Patent 1,909,845. In said patent the gimbal mounting 20, 25 permits the angular relation of the plane of the control bearing 18, 19 to be manually infinitely varied within predetermined limits with respect to the plane of rotation of the aircraft rotor. The effect of this is to permit the cyclic pitch of the rotor blades to be varied at will over the whole range of useful pitches and at any desired azimuth with respect to aircraft heading by mechanical linkage controlled by lever 26. In the present specification, manipulation of control lever 26 permits the operator to move valve levers 31 and 32 up or down at will, each independently of the other. The levers control cylinders 33 and 34 respectively and these in turn operate on spokes 61 and 62, spaced 90° apart, carrying inner control ball race 2. Therefore, the angular relation of bearing assembly 2, 3 can be allowed by the operator to be infinitely varied by interaction of spring 22 and the two hydraulically controllable extensible and retractable pitman devices with respect to the plane of rotation of the aircraft rotor. Consequently, the mechanism of the present specification also has the effect of permitting the cyclic pitch of the rotor blades to be varied at will over the whole range of useful pitches and at any desired azimuth with respect to aircraft heading.

I claim:

1. In the mechanism of a flight control system for rotary wing aircraft for making the angles of incidence of a wing blade selectively different at different points of the circle of revolution, the combination including a hub, attaching means holding the blade to said hub whereby the blade is held against motion radial thereto but is permitted a turning motion about its own longitudinal axis, lever means providing an effective lever arm for turning said blade about said axis, support means mounted adjacent said hub a reference plane of which is adjustable relative to the plane of rotation of said hub, a rotatable element mounted on said support means for rotation about a center on the axis of said hub in a plane of rotation fixed with respect to said reference plane, a link attaching an eccentric point on said rotatable element to said lever arm, a radial bracket on said hub, resilient means interposed between said hub and said rotatable element urging their respective planes of rotation out of parallelism, two-way extensible and retractable pitman means one end of which is attached to said support means and the other end of which is fixed with respect to the plane of rotation of said hub so that change of alignment between said reference plane and the plane of rotation of the said hub produces relative motion between said pitman end elements, and control means for selectively preventing said relative motion in either direction at will.

2. The combination of claim 1 in which the extensible and retractable pitman means includes a cylinder as one output-input element and a piston within said cylinder as the other output-input element, and the control means includes oil in said cylinder on both sides of said piston and valve means for controlling the flow of oil from one of said sides to the other.

3. A hydraulically controllable extensible and retractable pitman for controlling the spacing between two elements subject to recurrent intermixed force impulses toward and away from each other including, in combination, a cylinder attached to one element, a piston attached to the other element, a valve chamber carried by said cylinder, a first pair of passages between said cylinder and said chamber on opposite sides of said piston, check valves arranged in said first pair of passages to permit flow between said cylinder and said chamber in the same single direction in both of them, a second pair of passages between said cylinder and said chamber open for flow in the opposite direction to that permitted in said first pair, and valve means in said valve chamber for selectively closing either or both of said second pair of passages while leaving said first pair in intercommunication through said chamber.

4. A hydraulically controllable extensible and retractable pitman assembly for controlling the inclination of a swash plate to its axis of rotation including, in combination, a rotatable swash plate element, a non-rotatable support element for said swash plate element mounted to be variable in its angular relation to the axis of rotation of said swash plate element, a rotatable reaction arm mounted for synchronous rotation coaxial with said swash plate element in unvariable angular relation to said axis, resilient means interconnecting said swash plate element and said reaction arm and urging said swash plate element in a direction to vary its angular relation to said axis, a non-rotatable reaction arm a fixed distance from the center of said swash plate element, and a hydraulically controllable extensible and retractable pitman according to claim 3 controlling the spacing between said support element and said non-rotatable reaction arm.

References Cited in the file of this patent

UNITED STATES PATENTS

| Number | Name | Date |
| --- | --- | --- |
| Re. 22,595 | Upson | Jan. 23, 1945 |
| 1,909,845 | Nagler | May 16, 1933 |
| 2,256,635 | Young | Sept. 23, 1941 |
| 2,439,089 | Hodson | Apr. 6, 1948 |
| 2,529,479 | Bates | Nov. 14, 1950 |

FOREIGN PATENTS

| Number | Country | Date |
| --- | --- | --- |
| 652,817 | Great Britain | May 2, 1951 |
| 949,061 | France | Aug. 19, 1949 |